US007236944B1

(12) United States Patent
Schwartz et al.

(10) Patent No.: US 7,236,944 B1
(45) Date of Patent: Jun. 26, 2007

(54) DISCOUNT ESTIMATING AND PURCHASE SYSTEM AND METHOD

(76) Inventors: Scott H. Schwartz, 31 Algonquin Dr., Queensbury, NY (US) 12804; Terry V. DeLong, 17 Margaret Dr., Queensbury, NY (US) 12804

( * ) Notice: Subject to any disclaimer, the term of this patent is extended or adjusted under 35 U.S.C. 154(b) by 689 days.

(21) Appl. No.: 09/718,961

(22) Filed: Nov. 22, 2000

(51) Int. Cl.
*G06F 17/60* (2006.01)

(52) U.S. Cl. .......................................... 705/14; 705/26
(58) Field of Classification Search ................. 705/26, 705/27, 14
See application file for complete search history.

(56) References Cited

U.S. PATENT DOCUMENTS

| | | | |
|---|---|---|---|
| 5,202,826 A | 4/1993 | McCarthy | |
| 5,444,630 A | 8/1995 | Dlugos | |
| 5,615,109 A * | 3/1997 | Eder | 705/8 |
| 5,710,887 A * | 1/1998 | Chelliah et al. | 705/26 |
| 5,745,681 A | 4/1998 | Levine et al. | |
| 5,758,328 A | 5/1998 | Giovannoli | |
| 5,987,423 A * | 11/1999 | Arnold et al. | 705/14 |
| 6,049,778 A | 4/2000 | Walker et al. | |
| 6,078,897 A * | 6/2000 | Rubin et al. | 705/14 |
| 6,101,484 A | 8/2000 | Halbert et al. | |
| 6,128,599 A | 10/2000 | Walker et al. | |
| 6,260,024 B1 * | 7/2001 | Shkedy | 705/26 |
| 6,269,343 B1 * | 7/2001 | Pallakoff | 705/26 |
| 6,418,415 B1 * | 7/2002 | Walker et al. | 705/26 |
| 6,584,451 B1 * | 6/2003 | Shoham et al. | 705/26 |
| 6,631,356 B1 * | 10/2003 | Van Horn et al. | 705/26 |
| 6,934,690 B1 * | 8/2005 | Van Horn et al. | 705/26 |

FOREIGN PATENT DOCUMENTS

WO    WO 2005/038593 A2 *   4/2005

OTHER PUBLICATIONS

Welch, Cas, "Measuring the Total Quality of the Sales Function", National Productivity Review, Autum 1992.*

* cited by examiner

*Primary Examiner*—Mark Fadok
(74) *Attorney, Agent, or Firm*—Hunter E. Webb; Hoffman, Warnick & D'Alessandro LLC

(57) ABSTRACT

The present invention relates generally to a discount estimating and purchase system and method and, more particularly, to a discount quoting and purchasing system and method that allows quotes/purchases to be evaluated for discounts using various organizational units to maximize efficient order volumes and minimize total price.

33 Claims, 13 Drawing Sheets

Co-op Buying

| Item | | A | B | C | D | E | F | G | H | I | J | K | L |
|---|---|---|---|---|---|---|---|---|---|---|---|---|---|
| Item Pricing Level | Person A | 1300 | 0 | 180 | 200 | 250 | 40 | 90 | 30 | 10 | 20 | 0 | 30 |
| Volume Discounts given | Person B | 100 | 1000 | 0 | 0 | 0 | 0 | 0 | 0 | 0 | 0 | 0 | 0 |
| after a certain Volume | Person C | 300 | 0 | 50 | 50 | 0 | 0 | 0 | 50 | 50 | 0 | 0 | 100 |
| of items Purchased | Person D | 500 | 50 | 30 | 40 | 90 | 0 | 500 | 0 | 10 | 10 | 50 | 100 |
| (Assume 100 for each item) | Person E | 200 | 100 | 0 | 0 | 0 | 50 | 0 | 700 | 40 | 80 | 50 | 70 |
| | Total | 2400 | 1150 | 260 | 290 | 340 | 90 | 590 | 780 | 110 | 110 | 100 | 300 |

| Group | | Coop A - C Group | Coop D - F Group | Coop G - I Group | Coop J - L Group |
|---|---|---|---|---|---|
| Group Pricing Level | Person A | 1480 | 490 | 130 | 50 |
| Volume Discounts given | Person B | 1100 | 0 | 0 | 0 |
| after a certain Volume | Person C | 350 | 50 | 100 | 100 |
| in Group Purchased | Person D | 580 | 130 | 510 | 160 |
| (Assume 500 for each Group) | Person E | 300 | 50 | 740 | 200 |
| | Total | 3810 | 720 | 1480 | 510 |

| Master Group | | Coop A - F Master Group | Coop G - L Master Group |
|---|---|---|---|
| Additional Group Pricing | Person A | 1970 | 180 |
| Volume Discounts given | Person B | 1100 | 0 |
| after a certain Volume | | 400 | 200 |
| in Group Purchased | | 710 | 670 |
| (Assume 2000 for each Additional Group) | | 350 | 940 |
| | Total | 4530 | 1990 |

| Total Order | | Coop Total Order |
|---|---|---|
| Order Pricing Level | Person A | 2150 |
| Volume Discounts given | Person B | 1100 |
| after a certain Volume | Person C | 600 |
| in Order Purchased | Person D | 1380 |
| (Assume 5000 for each Order) | Person E | 1290 |
| | Total | 6520 |

FIG. 5

| Quantity | Item Number | Description | Price / Per | Total |
|---|---|---|---|---|
| 100 Update | 0406-FIREX | SMOKE DETECTOR DIRECT WIRE INT Details | $7.00 / EA | $700.00 |
| 1 Update | 10000-PW | REMOTE DIMMING WHITE Details | $17.14 / EA | $17.14 |
| 1 Update | 1451-21 | SWITCH S-POLE GROUNDED 15A IVO Details | $0.65 / EA | $0.65 |
| 10 Update | 6599-I | RECEPT 15A GFI DUPLEX IVORY Details | $6.60 / EA | $66.00 |
| 30 Update | 82010 | RECEPTACLE 15A DUPLEX GROUNDED Details | $0.39 / EA | $11.70 |
| 200 Update | BR120 | 20A 1POLE 1SPACE BREAKER Details | $3.10 / EA | $620.00 |

* Shipping charges may apply * This job quoted at: $1,479.49

RECOMMENDATION:
BUY 50 MORE 20A 1POLE SPACE
BREAKER TO RECEIVE 10% DISCOUNT

DALE ELECTRIC SUPPLY CO.
P.O. BOX 305
GLENS FALLS, NEW YORK 12801
1-800-452-7733

November 09, 2000 02:54 PM

20 Results Found 20 Items Per Page

Add to Master List     Add to Quote

| Item Number | Description | Mfg. | Price | Click for Details |
|---|---|---|---|---|
| KTU-400 | LIMITRON FAST ACTING FUSE | Bussmen Division | $262.83 | Details |
| KTU-1200 | LIMITRON FAST ACTING FUSE | Bussmen Division | $291.06 | Details |
| KTU-1350 | LIMITRON FAST ACTING FUSE | Bussmen Division | $465.44 | Details |
| KTU-1500 | LIMITRON FAST ACTING FUSE | Bussmen Division | $465.44 | Details |
| KTU-1600 | LIMITRON FAST ACTING FUSE | Bussmen Division | $392.19 | Details |
| KTU-1800 | LIMITRON FAST ACTING FUSE | Bussmen Division | $613.66 | Details |
| KTU-2000 | LIMITRON FAST ACTING FUSE | Bussmen Division | $547.20 | Details |
| KTU-2500 | LIMITRON FAST ACTING FUSE | Bussmen Division | $730.38 | Details |
| KTU-3000 | LIMITRON FAST ACTING FUSE | Bussmen Division | $291.06 | Details |
| KTU-3500 | LIMITRON FAST ACTING FUSE | Bussmen Division | $1,296.86 | Details |
| KTU-400 | LIMITRON FAST ACTING FUSE | Bussmen Division | $291.06 | Details |
| KTU-4000 | LIMITRON FAST ACTING FUSE | Bussmen Division | $1,175.85 | Details |
| KTU-4500 | LIMITRON FAST ACTING FUSE | Bussmen Division | $1,381.36 | Details |
| KTU-5000 | LIMITRON FAST ACTING FUSE | Bussmen Division | $1,581.36 | Details |
| KTU-600 | LIMITRON FAST ACTING FUSE | Bussmen Division | $262.83 | Details |

Item (124A-B, 124C-F, 124G-I, 124J-L — 122A through 122L, Individual Buying)

| Item | A | B | C | D | E | F | G | H | I | J | K | L |
|---|---|---|---|---|---|---|---|---|---|---|---|---|
| Person A | 1300 | 0 | 180 | 200 | 250 | 40 | 90 | 30 | 10 | 20 | 0 | 30 |
| Total | 1300 | 0 | 180 | 200 | 250 | 40 | 90 | 30 | 10 | 20 | 0 | 30 |

Item Pricing Level Volume Discounts given after a certain Volume of Items Purchased (Assume 100 for each item)

Group (124)

| Group | A - B Group | C - F Group | G - I Group | J - L Group |
|---|---|---|---|---|
| Person A | 1680 | 670 | 130 | 50 |
| Total | 1680 | 670 | 130 | 50 |

Group Pricing Level Volume Discounts given after a certain Volume in Group Purchased (Assume 500 for each Group)

Master Group (126)

| Master Group | A - F Master Group | G - L Master Group |
|---|---|---|
| Person A | 1970 | 180 |
| Total | 1970 | 180 |

Additional Group Pricing Volume Discounts given after a certain Volume In Group Purchased (Assume 2000 for each Additional Group)

Total Order (120)

| Total Order | Total Order |
|---|---|
| Person A | 2150 |
| Total | 2150 |

Order Pricing Level Volume Discounts given after a certain Volume in Order Purchased (Assume 5000 for each Order)

Co-op Buying

| Item | | A | B | C | D | E | F | G | H | I | J | K | L |
|---|---|---|---|---|---|---|---|---|---|---|---|---|---|
| Item Pricing Level | Person A | 1300 | 0 | 180 | 200 | 250 | 40 | 90 | 30 | 10 | 20 | 0 | 30 |
| Volume Discounts given after a certain Volume of items Purchased (Assume 100 for each item) | Person B | 100 | 1000 | 0 | 0 | 0 | 0 | 0 | 0 | 0 | 0 | 0 | 0 |
| | Person C | 300 | 0 | 50 | 50 | 0 | 0 | 0 | 50 | 50 | 0 | 0 | 100 |
| | Person D | 500 | 50 | 30 | 40 | 90 | 0 | 500 | 0 | 10 | 10 | 50 | 100 |
| | Person E | 200 | 100 | 0 | 0 | 0 | 50 | 0 | 700 | 40 | 80 | 50 | 70 |
| Total | | 2400 | 1150 | 260 | 290 | 340 | 90 | 590 | 780 | 110 | 110 | 100 | 300 |

| Group | | Coop A - C Group | Coop D - F Group | Coop G - I Group | Coop J - L Group |
|---|---|---|---|---|---|
| Group Pricing Level | Person A | 1480 | 490 | 130 | 50 |
| Volume Discounts given after a certain Volume in Group Purchased (Assume 500 for each Group) | Person B | 1100 | 0 | 0 | 0 |
| | Person C | 350 | 50 | 100 | 100 |
| | Person D | 580 | 130 | 510 | 160 |
| | Person E | 300 | 50 | 740 | 200 |
| Total | | 3810 | 720 | 1480 | 510 |

| Master Group | | Coop A - F Master Group | Coop G - L Master Group |
|---|---|---|---|
| Additional Group Pricing | Person A | 1970 | 180 |
| Volume Discounts given after a certain Volume in Group Purchased (Assume 2000 for each Additional Group) | Person B | 1100 | 0 |
| | Person C | 400 | 200 |
| | Person D | 710 | 670 |
| | Person E | 350 | 940 |
| Total | | 4530 | 1990 |

| Total Order | | Coop Total Order |
|---|---|---|
| Order Pricing Level | Person A | 2150 |
| Volume Discounts given after a certain Volume in Order Purchased (Assume 5000 for each Order) | Person B | 1100 |
| | Person C | 600 |
| | Person D | 1380 |
| | Person E | 1290 |
| Total | | 6520 |

FIG. 11

| Item Unit | A | B | C | D | E | F | G | H | I | J | K | L | M |
|---|---|---|---|---|---|---|---|---|---|---|---|---|---|
| Each Price (Dollars) | 10 | 11 | 12 | 150 | 250 | 200 | 600 | 750 | 400 | 20 | 40 | 60 | 500 |
| Each Weight (Pounds) | 1 | 2 | 1 | 10 | 12 | 11 | 50 | 45 | 30 | 100 | 120 | 130 | 25 |
| Quantity Ordered | 10 | 5 | 4 | 3 | 1 | 0 | 4 | 10 | 3 | 100 | 0 | 50 | 1 |
| Dollars Ordered | 100 | 55 | 48 | 450 | 250 | 0 | 2400 | 7500 | 1200 | 2000 | 0 | 3000 | 500 |
| Weight Ordered | 10 | 10 | 4 | 30 | 12 | 0 | 200 | 450 | 90 | 10000 | 0 | 6500 | 25 |
| Item Volume Measurement | $$$ | $$$ | $$$ | Quantity | Quantity | Quantity | Quantity | Quantity | Quantity | Pounds | Pounds | Pounds | Quantity |
| First Item VDT | 100 | 100 | 100 | 5 | 5 | 10 | 5 | 5 | 5 | 1000 | 2000 | 1000 | 5 |
| Second Item VDT | 150 | 175 | 125 | 10 | 10 | 20 | 10 | 10 | 10 | 2000 | 5000 | 5000 | 10 |
| Third Item VDT | 200 | 225 | 150 | 30 | 25 | 50 | 25 | 20 | 30 | 5000 | 10000 | 10000 | 20 |
| Total Item Volume Ordered | 100 | 55 | 48 | 3 | 1 | 0 | 4 | 10 | 3 | 10000 | 0 | 6500 | 1 |
| Item Volume Threshold Obtained | 1st | None | None | None | None | None | None | None | None | 3rd | None | 2nd | None |

| Second/Junior Group Unit | A - C Group | D - F Group |
|---|---|---|
| Quantity Ordered | 19 | 4 |
| Dollars Ordered | 203 | 700 |
| Weight Ordered | 24 | 42 |
| Group Volume Measurement | $$$ | $$$ |
| First Junior Group VDT | 200 | 500 |
| Second Junior Group VDT | 500 | 1000 |
| Third Junior Group VDT | 1000 | 1500 |
| Total Group Volume Ordered | 203 | 700 |
| Junior Group VDT Obtained | 1st | 1st |

| First/Senior Group Unit | A - F Group | G - I Group | J - L Group |
|---|---|---|---|
| Quantity Ordered | 23 | 17 | 150 |
| Dollars Ordered | 903 | 11100 | 5000 |
| Weight Ordered | 66 | 740 | 16500 |
| Group Volume Measurement | $$$ | Quantity | Pounds |
| First Senior Group VDT | 800 | 15 | 5000 |
| Second Senior Group VDT | 1500 | 30 | 10000 |
| Third Senior Group VDT | 2000 | 100 | 50000 |
| First VDT Rank | 1 | 5 | 10 |
| Second VDT Rank | 3 | 10 | 20 |
| Third VDT Rank | 5 | 15 | 30 |
| Total Group Volume Ordered | 903 | 17 | 16500 |
| Group Volume Threshold Obtained | 1st | 1st | 2nd |
| Group Rank Obtained | 1 | 5 | 20 |

| Master Group Unit | A - I Master Group |
|---|---|
| Quantity Ordered | 40 |
| Dollars Ordered | 12003 |
| Weight Ordered | 806 |
| First Master Group RDT | 5 |
| Second Master Group RDT | 10 |
| Third Master Group RDT | 20 |
| Master Group Rank Total | 6 |
| Master Group Rank Threshold Obtained | 1st |

| Total Order | Total Order |
|---|---|
| Quantity Ordered | 191 |
| Dollars Ordered | 17503 |
| Weight Ordered | 17331 |

DISCOUNT ESTIMATING AND PURCHASE SYSTEM AND METHOD

BACKGROUND OF THE INVENTION

1. Technical Field

The present invention relates generally to a discount estimating and purchase system and method and, more particularly, to a discount quoting and purchasing system and method that allows quotes/purchases to be evaluated for discounts using various organizational units to maximize efficient order volumes and minimize total price.

2. Related Art

Historically, pricing model systems and methods provide quotes and/or purchases based on per item price and, possibly, a discounted item volume price or purchase volume price. Unfortunately, current systems and methods do not allow for providing discounts based on efficiencies that do not manifest themselves by reviewing overall volume levels of a purchase. For example, a volume level discount for products or services purchased from a distributor, wholesaler or retailer is based on the total purchase of those products or services. A review of the overall volume of a purchase that includes items from multiple manufacturers does not provide analysis of whether each individual manufacturer's discount level has been met. Similarly, overall review of a purchase volume does not reveal such things as: whether a purchase efficiently fills a delivery truck, whether all the items ship from the same location, or whether items can be shipped directly from the manufacturer to the end user. Accordingly, there is a need in the art for a discount estimating and purchasing system and method that allows for evaluation of efficiencies that do not manifest themselves by review of just overall volume levels of a quote or purchase.

It would also be advantageous if the system could also provide this improved analysis for individual users and for cooperatives of users.

Another disadvantage of current systems and methods is that they are limited to calculations based on a single type of volume, i.e., quantity, monetary amount, weight, etc. Accordingly, it would be advantageous if a system could provide a harmonizing model for items, that are measured with different volume types.

Another disadvantage of current systems and methods is that they do not provide dynamic mechanisms for consideration of market conditions in order to maximize efficiencies and profitability. Accordingly, it would be advantageous if a system could use more dynamic a formulas and tables and provide flexibility in structuring discounts to accommodate market conditions.

Yet another disadvantage of current systems and methods is that they do not provide for allocation of part of a volume of items quoted/purchased to achieve the lowest total price.

SUMMARY OF THE INVENTION

The present invention is a quote and purchasing system that allows the combining of goods and services into various organizational units for analysis relative to varied discount thresholds to maximize efficient order volumes from users and reward efficient order volumes with maximized discounted price for users. The system allows for evaluation of efficiencies that do not manifest themselves by review of just overall volume levels of a quote or purchase. Users can use the system to gain personalized discounted quotes and/or purchases, or multiple users may aggregate orders together in order to achieve larger discounts. Further, the invention provides a harmonizing model by relating discount thresholds to a rank that can be used to interrelate volumes of items that are measured with different volume types, e.g., quantity, weight, etc. The invention also provides for allocation of part of a volume of items quoted/purchased to achieve the lowest total price. The invention's ability to provide a variety of organizational units that can further be tiered into sub-organizational units provides flexibility to accommodate any market condition.

In a first aspect of the invention is provided a system for calculating discounts on items, the system comprising: a processor; and a memory, including a program executable by the processor, the program including: an estimator configured to allow user selection of at least one item for creating a cost quote of total price, each item being a member of an item unit having associated therewith a volume; a unit setting module configured to allow setting membership of at least one item unit in at least one first group unit, each first group unit having associated therewith a cumulative volume of the at least one item unit therein; a discount rule module configured to allow setting at least one discount threshold for each first group unit, each discount threshold of a first group unit having an associated discounted price given to a user when the discount threshold is met; and a calculator configured to recommend selection of additional volume to attain a next discount threshold.

In a second general aspect of the invention is provided a method for calculating discounts for quotes or purchases of items, the method comprising the steps of: allowing selection of an item by a user to attain a quote; organizing an item available for purchase into an item unit and at least one first group unit that includes one or more items, each item unit and each group unit having associated therewith a volume; setting at least one discount threshold for each item unit and each first group unit, each discount threshold having an associated discounted price; calculating when a volume of an item unit is within a discount variance of a next discount threshold for the item unit; recommending selection of additional volume to attain the next discount threshold for the item unit; calculating when a volume of a first group unit is within a discount variance of a next discount threshold for the first group unit; and recommending selection of additional volume to attain the next discount threshold for the first group unit.

In a third general aspect of the invention is provided a system for estimating purchase cost of items and making a recommendation to attain a discounted price, the system comprising: a processor; and a memory, including a program executable by the processor, the program including: a) an estimator configured to allow a user to select at least one item to attain a total price quote; b) an administration module configured to allow organization of an item into at least one unit, each unit including at least one discount threshold that may be attained by selection of a volume of an item organized therein; c) a discounter including a calculator configured to: i) determine a next discount threshold for each unit; and ii) recommend selection of additional volume to attain a next discount threshold in at least one unit; and d) a purchasing module configured to permit a user to make a purchase.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein:

FIG. 5 is a display illustrating a past job quote building window;

FIG. 7 is a display illustrating an item search result window;

FIG. 10 is a spreadsheet illustrating a simplified data organization for an individual user;

FIG. 11 is a spreadsheet illustrating a simplified data organization for a coop;

FIG. 12 is a spreadsheet illustrating data organization in more detail for an individual user.

DESCRIPTION OF THE PREFERRED EMBODIMENTS

For convenience of description only, the description includes the following sections:

I. System Overview

II. Shopping System

III. Coop Module

IV. Discounter
   A. Administration Module
   B. Calculator

V. Method

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment.

I. System Overview

The present invention relates to a system for calculating discounts on items, the system comprising: a processor; and a memory, including a program executable by the processor, the program including: an estimator configured to allow user selection of at least one item for creating a cost quote of total price, each item being a member of an item unit having associated therewith a volume; a unit setting module configured to allow setting membership of at least one item unit in at least one first group unit, each first group unit having associated therewith a cumulative volume of the at least one item unit therein; a discount rule module configured to allow setting at least one discount threshold for each first group unit, each discount threshold of a first group unit having an associated discounted price given to a user when the discount threshold is met; and a calculator configured to recommend selection of additional volume to attain a next discount threshold.

Figure 1:
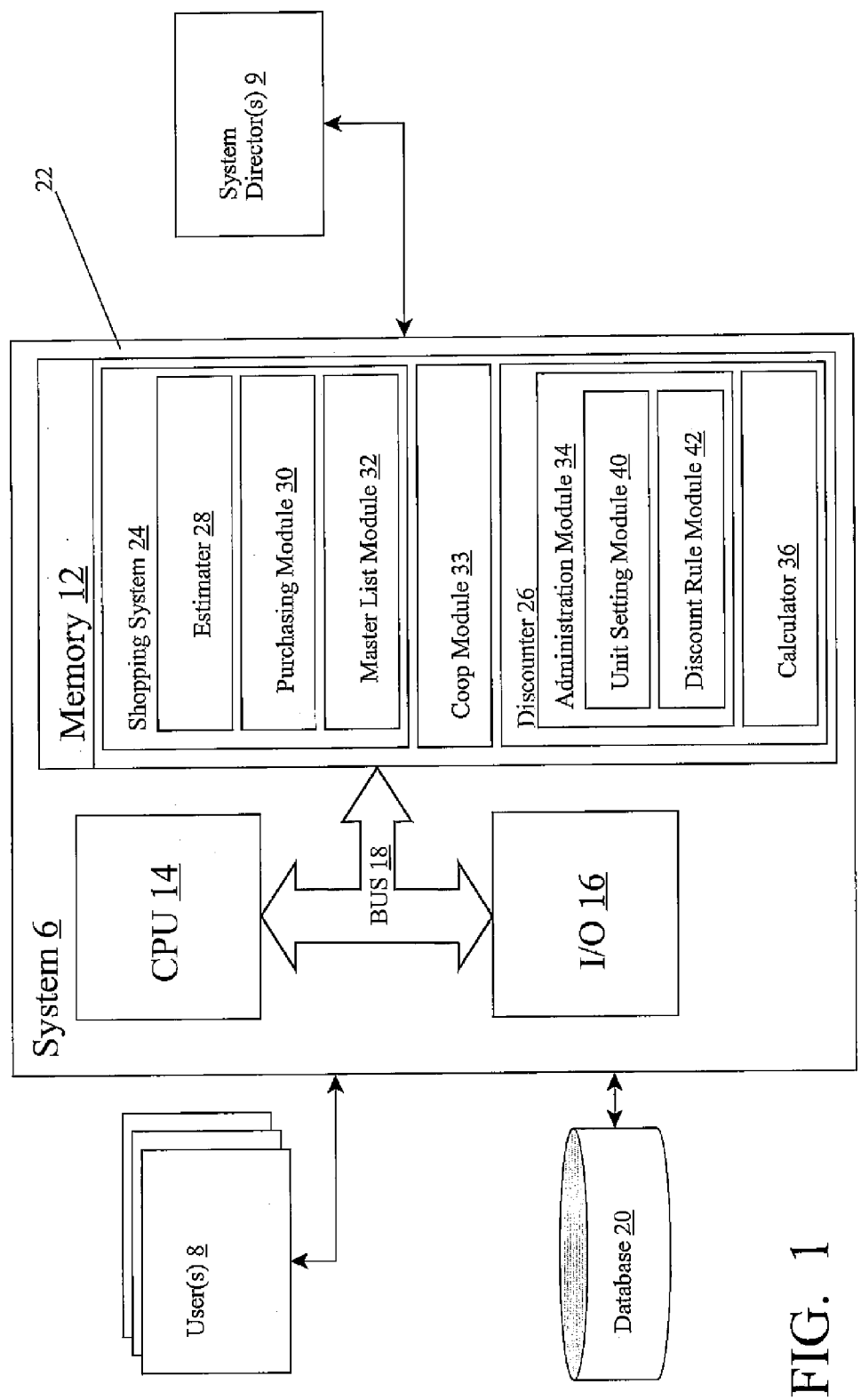
FIG. 1 is a block diagram of operative functions of the present invention.

FIG. 1 is a block diagram of a system 6 for calculating discounts on items, estimating purchase cost of items and making a recommendation to attain a discounted price in accordance with a preferred embodiment of the present invention. System 6 is preferably a computer system accessible by a user 8 in a conventional manner, as will be described below. System 6 preferably includes a memory 12, a central processing unit (CPU) 14, an input/output device(s) (I/O) 16, and a bus 18. A database 20, as will be described in more detail below, may also be provided. Memory 12 preferably includes a program product 22 that, when executed by CPU 14, comprises various functional capabilities described in further detail below. Memory 12 (and database 20) may comprise any known type of data storage system and/or transmission media, including magnetic media, optical media, random access memory (RAM), read only memory (ROM), a data object, etc. Moreover, memory 12 (and database 20) may reside at a single physical location comprising one or more types of data storage, or be distributed across a plurality of physical systems. CPU 14 may likewise comprise a single processing unit, or a plurality of processing units distributed across one or more locations, e.g., on a client and server. I/O 16 may comprise any known type of input/output device including a network system, modem, keyboard, mouse, voice recognition system, CRT, printer, disc drives, etc. Additional components, such as cache memory, communication systems, system software, etc., may also be incorporated into system 6.

System 6 may reside on a personal computer that may or may not be part of a computer network. However, as recognized in the field, system 6 preferably includes one or more central computer, i.e., server. Here, system satellite servers may each contain only one system/module with the remainder of the systems/modules resident on a centrally located server. In another embodiment, a number of servers may be present in a central location, each having different software applications resident therein. Alternatively, a number of servers may reside in a central location, each containing all of the systems/modules resident therein. A server computer typically comprises an advanced mid-range multiprocessor-based server, such as the Ultra II from Sun Microsystems or the RS6000 from IBM, utilizing standard operating systems, software written in C++, Java or a similar language, which is designed to drive the operation of the particular hardware and which is compatible with other system components, and I/O controllers. A personal computer may typically comprise an INTEL PENTIUM III microprocessor, or like processor, such as found in a Dell Dimensions XTS T450 computer.

In the following discussion, it will be understood that the method steps discussed preferably are performed by processor 14 executing program product/instructions 22 stored in memory 12, such as instructions of discounter 26. Program product 22 can be initially loaded into memory from a computer readable medium. It is understood that the various devices, modules, mechanisms and systems described herein may be realized in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

As used herein, a "user" 8 refers to any individual or entity that uses system 6. User(s) 8 may include, for example, purchasers or coop administrators. An internal system director(s) 9 may also access system 6. An "item" as used herein is any product or service available for price quotation and/or purchase through system 6. It should be recognized that any item may have a number of variants, for example, size, color, adaptability, etc., each of which is considered to establish a different item. A catalog of items is stored in database 20 for access by system 6.

User(s) 8 may access system 6 via a direct terminal connected to system 6, or a remote workstation in a client-server environment. In the latter case, the client and server may be connected via the Internet, wide area networks (WAN), local area networks (LAN) or other private networks. The server and client may utilize conventional token ring connectivity for WAN, LAN, or other private networks, or Ethernet, or other conventional communications standards. Where user(s) 8 is connected to a system server via the Internet, connectivity could be provided by conventional TCP/IP sockets-based protocol. In this instance, an Internet service provider outside system 6 would provide connectivity to a system server within system 6. In a preferred setting, user(s) 8 connect to system 6 via the Internet using a conventional Internet browser such as Microsoft Internet Explorer® and Netscapte Navigator®.

Program product 22 of system 6 preferably includes the following: a shopping system 24 for selecting items to purchase, creating quotes and purchasing items; a coop module 33 that allows creation of cooperatives of a plurality of users 8 to pool purchases and cumulatively attain discounted prices; and a discounter 26 for conducting discount related tasks, as will be described below. Shopping system 24 includes an estimator 28 for selecting at least one item and creating a cost quote (or revising a past quote) of item prices and total price; a purchasing module 30 for purchasing items; and a master list module 32 for a user to designate items they frequently purchase. Discounter 26 preferably includes an administration module 34 for configuring discount thresholds and unit membership, and a calculator 36 for conducting calculations relative to discounts.

II. Shopping System

Referring to FIGS. 2–9, details of shopping system 24 are shown.

Figure 2:
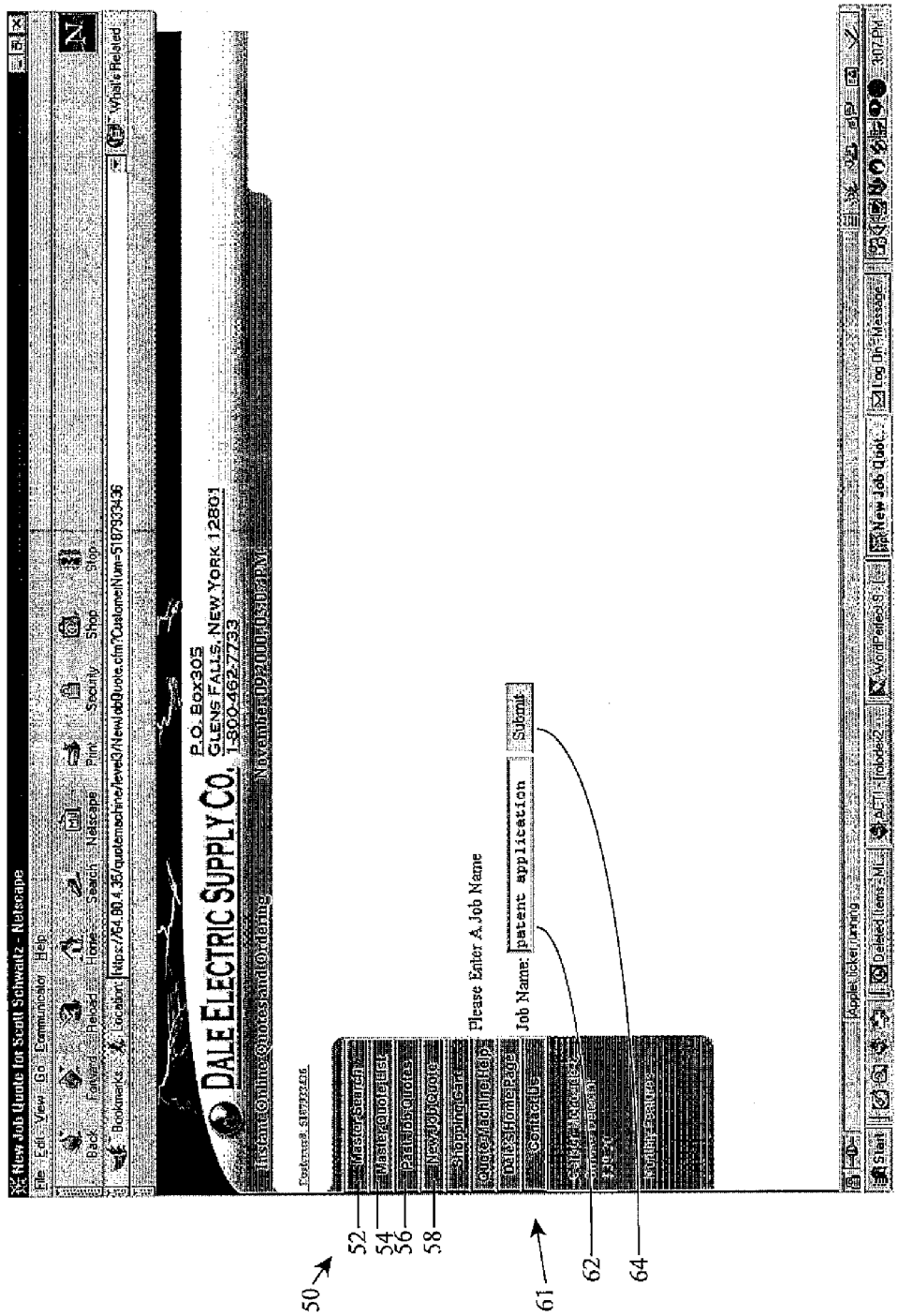
FIG. 2 is a display illustrating a new job quote naming window of the system of FIG. 1.
Figure 3:
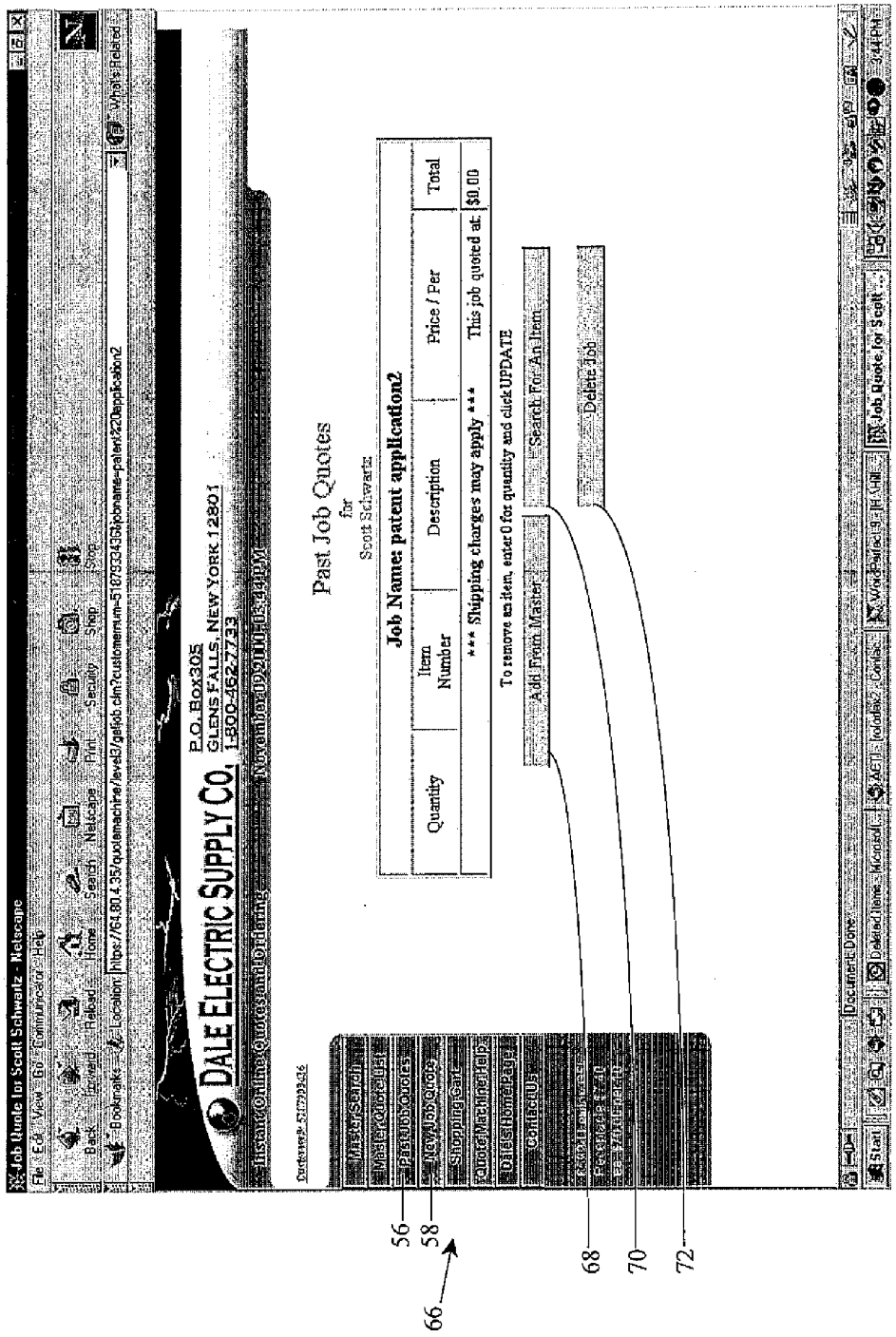
FIG. 3 is a display illustrating a new job quote building window.

As shown in FIG. 2, when a user 8 accesses system 6, a menu 50 is presented by shopping system 24. From menu 50 a user 8 may, inter alia, select to: conduct a Master Search of available items 52, access a Master Quote List 54, access Past Job Quotes 56, create a New Job Quote 58 or access purchasing module 32, i.e., Shopping Cart 60.

Figure 4:
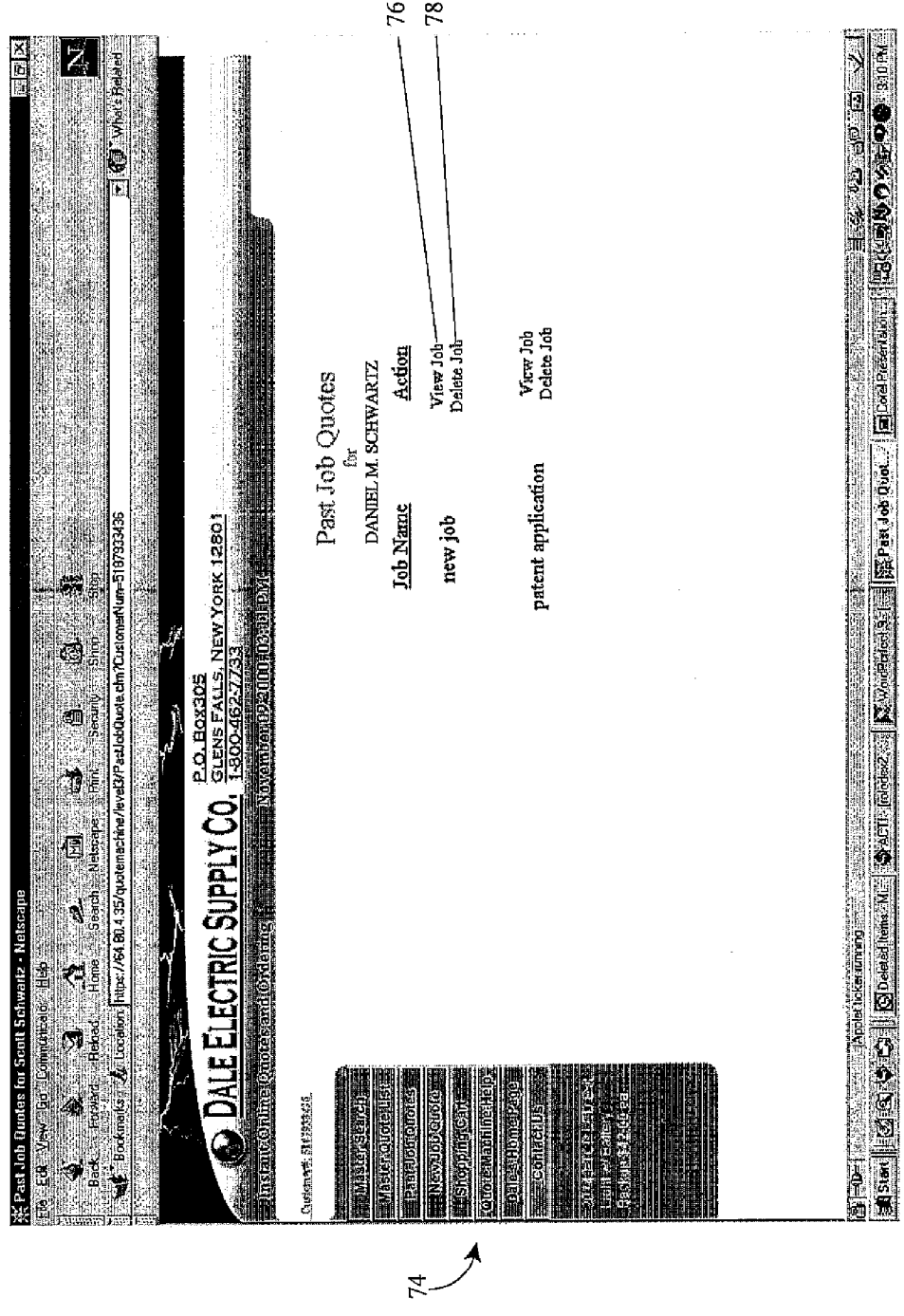
FIG. 4 is a display illustrating a past job quote list window.

Relative to conducting job estimations or quotes via estimator 28, a user 8 may select to create a New Job Quote 58 or access a Past Job Quote 56. As shown in FIG. 2, when user 8 selects to create a new job quote, a new job naming window 61 is provided. User 8 may then enter a new job name at entry 62 and then select 'Submit' button 64, after which a user 8 is directed to a new job quote building window 66, shown in FIG. 3. When user 8 selects to access Past Job Quotes 56, as shown in FIG. 4, user 8 is presented with a past job quote list window 74 from which user 8 may select to View a Job 76 or Delete a Job 78. Upon selection of View Job 76, a user 8 is presented with a past job quote building window 80, as shown in FIG. 5.

From new job quote building window 66 (FIG. 3), a user 8 may build a quote by adding items. From past job quote building window 80 (FIG. 5), a user 8 may add items or review/revise a past quote. Each job quote building window 66, 80 includes the following selections: Add Items from a Master List 68, Search For An Item 70 and Delete a Job 72. Where items (e.g., smoke detector 82 in FIG. 5) are present in quote building window 66, 80, a Send to Shopping Cart selection 84 is provided so user 8 may activate purchasing module 30.

Figure 6:
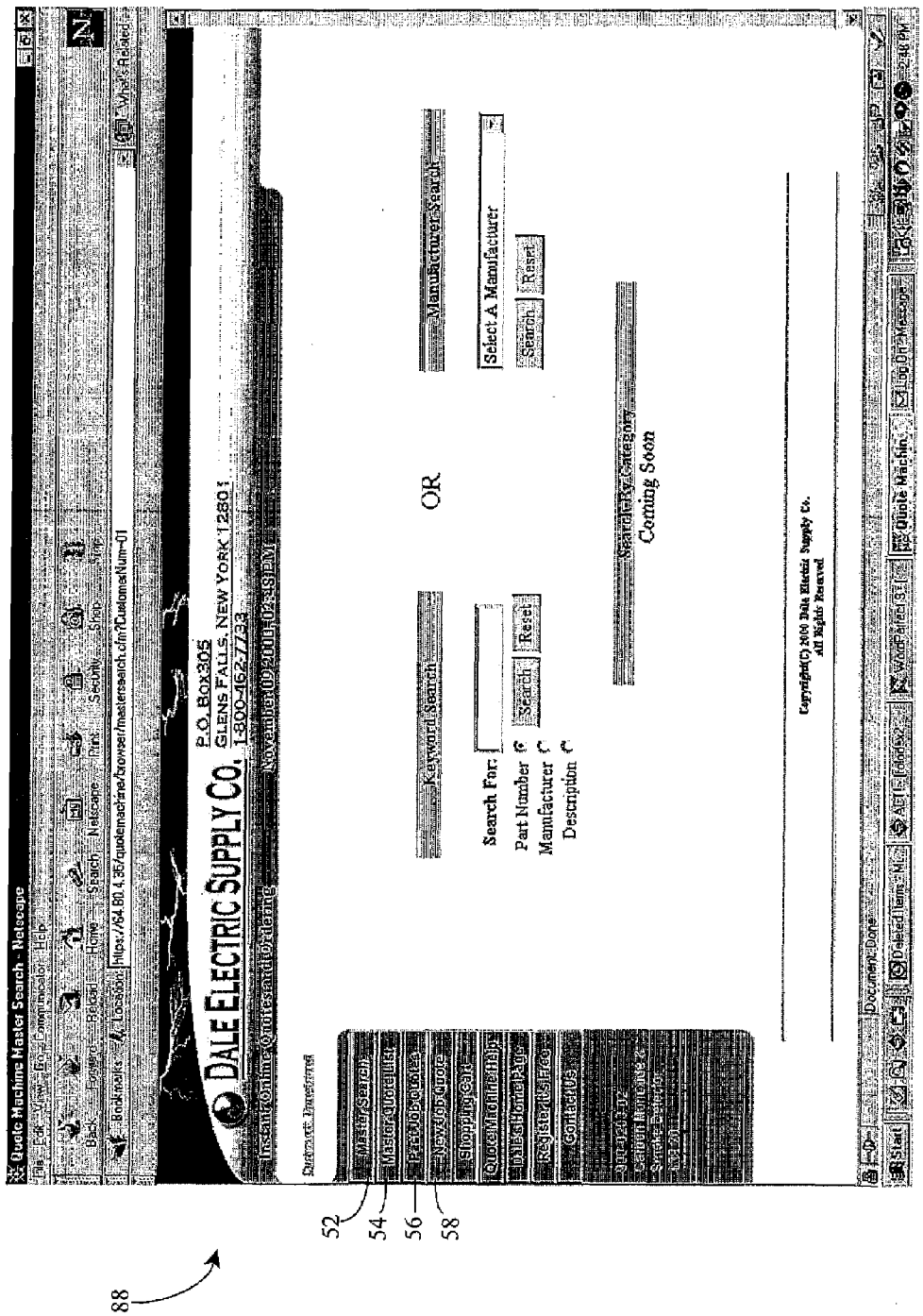
FIG. 6 is a display illustrating an item search window.

As shown in FIG. 5, estimator 30 provides an item data line 86 for each item once selected. Each item data line 86 may include, for example, a volume amount entry, e.g., quantity, with an Update button selection, item number, description of item including a Detail selection through which a user can see more detailed information about the item, price/per item and total for item. An item may be deleted from the quote by inserting zero for volume amount and selecting the Update button. An item may be added to quote in one of two ways. First, a user 8 may select to Search for an Item 70. In this case, an item search engine window 88, shown in FIG. 6, is provided through which user 8 may search for items, for example, by part number, manufacturer, description, category, etc. When a search is complete, user 8 is provided with a search result window 90, shown in FIG. 7, including a list of items. A user 8 may select an item, for instance, by highlighting the item and choosing Add to Quote 92. Selecting to Add to Quote will add the item to the list of quote building window 66, 80 (FIGS. 3 and 5) and allow a quantity to be entered so a quote can be built. Return to quote building window 66, 80 may be automatic or require user 8 to select Past Job Quotes 56 or New Job Quote 58 from menu 50. Also at search result window 90, a user 8 may select to Add an item to Master List 92, details of which are described below. Access to item search engine window 88 may also be gained by selecting Master Search 52 from menu 50, preferably available at every interface of system 6.

Figure 8:
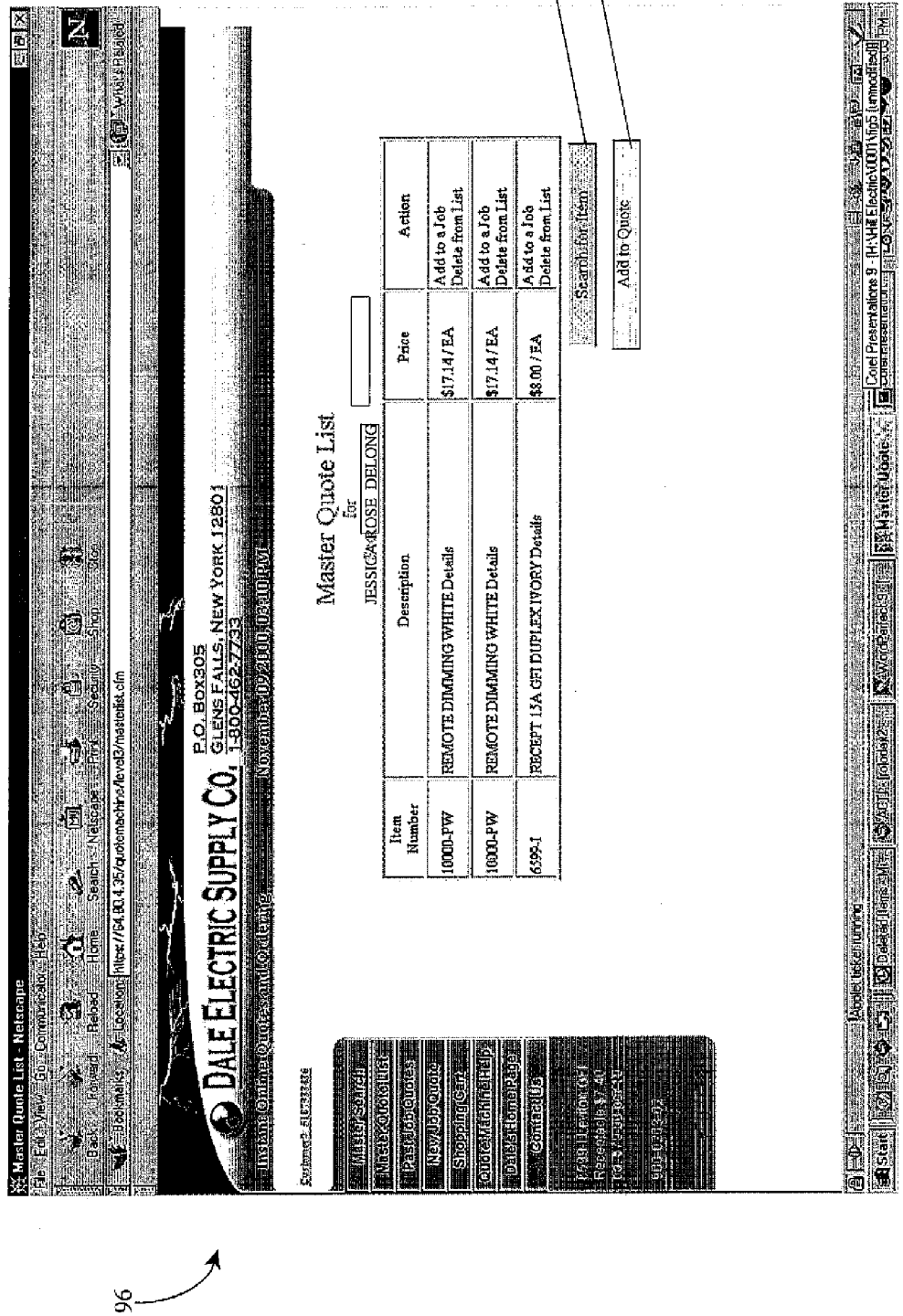
FIG. 8 is a display illustrating a master quote list window.

A second way of selecting an item is through master list module 32. In this case, a user 8 may access master list module 32 by selecting Add from Master List selection 68, available at quote building window 66, 80, or Master Quote List selection 54, available on menu 50. As shown in FIG. 8, master list module 32 creates and maintains a master quote list 96 for each user 8. Master quote list allows a user 8 to keep a special list of items that he/she purchases frequently and, hence, prevents user 8 from continually having to search for items. From master quote list 96 window, user 8 may select to: Search for Item 98, which directs user 8 to item search engine window 88 (FIG. 6), or Add to Quote 100. As indicated above, items may be added to master quote list 96 by selecting Add to Master List 94 at item search result window 90 (FIG. 7).

Figure 9:
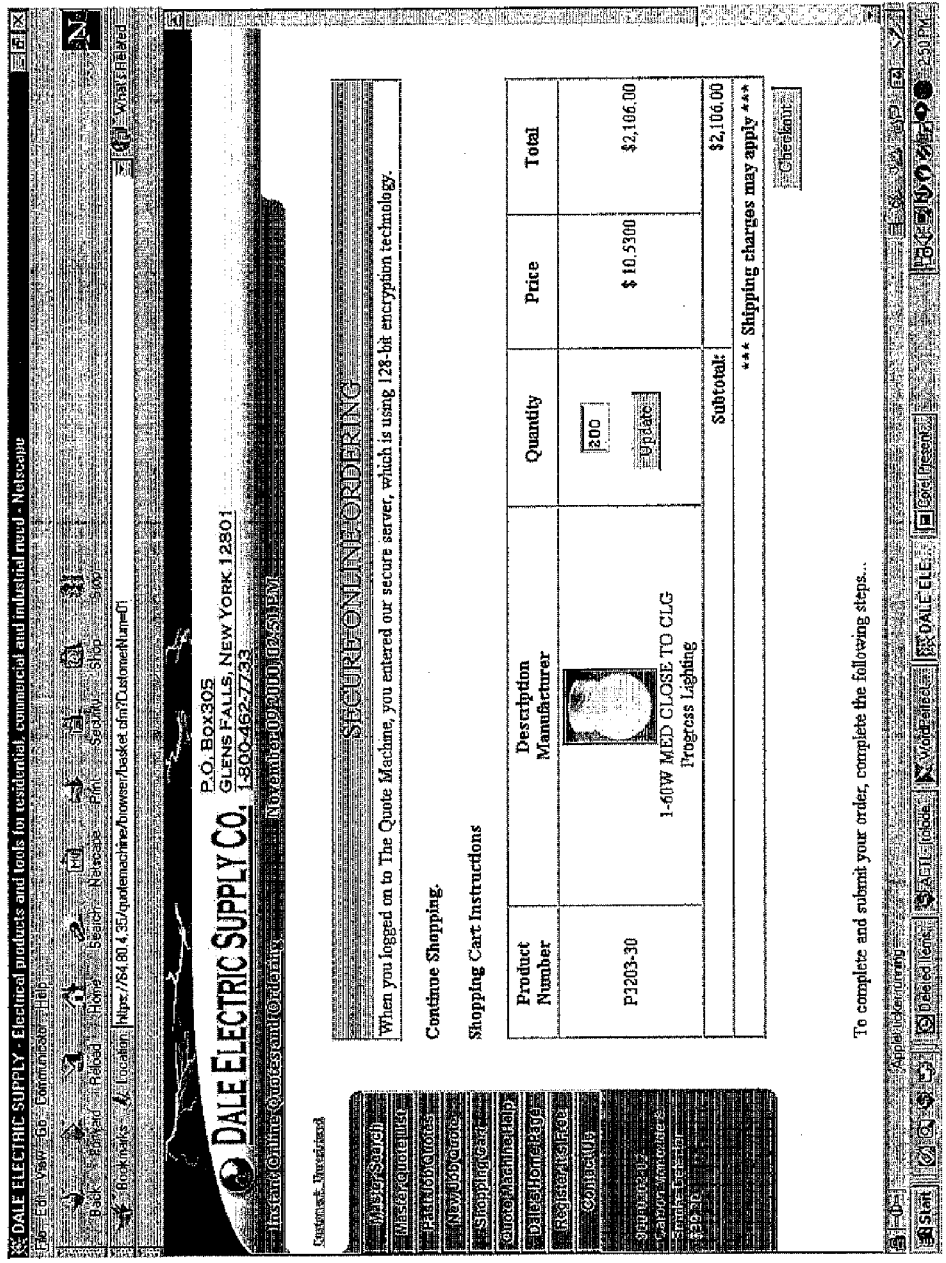
FIG. 9 is a display illustrating a shopping cart window.

Returning to FIG. 5, when user 8 is complete building a quote, he/she may select to Send the quote to the Shopping Cart 84, which activates purchasing module 30. As shown in FIG. 9, purchasing module 30 implements a conventional shopping cart checkout system 102 through which user 8 may review items to purchase, make final selection of quantity and choose to Checkout. As known in the art, subsequent windows may request billing information from user 8, e.g., name, address, payment method, purchase order numbers, ship to address and other information necessary for individual orders. Before completing the order, options of add, change, purchase or delete the order are also given.

III. Coop Module

Returning to FIG. 1, system 6 includes a coop module 33. Using coop module 33 a person or entity, called the administrator, can establish a purchasing coop with system 6 through which a plurality of users 8 can pool purchases and cumulatively attain discounted prices.

Coop module 33 is configured to allow an administrator to set at least one of: purchase closing time, pricing structure, maximum discount threshold available and coop membership rules. Purchase closing time may be a time limit imposed on coop member purchases for various reasons, e.g., to assure a coop administrator closure on a purchase period and receipt of the associated profit. Coop membership rules may be any regulation imposed on users 8. For example, a maximum number of discounted prices attainable, pricing levels at which user 8 must commit to buy an item, etc. Using pricing structure and/or a maximum discount threshold, an administrator can assure that the administrator is rewarded for administering the coop. For instance, pricing structure may be set such that items cost are high enough to assure the administrator a profit, but not so high that the coop is not advantageous to members. Similarly, a maximum discount threshold (MDT) available to coop members may be set such that any discounted price attained by the coop above the MDT is provided to the administrator. Using coop module 33, an administrator may also monitor an individual user account.

When a co-op user 8 logs in, information can be displayed detailing the purpose of the coop and instructions. User 8 may then select items as described above. Each time a new item or a new volume is entered, or an existing volume is changed, system 6 provides the below-described calculations and operations for the individual user and for the coop. User 8 must provide a method of payment (i.e. a credit card) to guarantee purchase if a group unit volume meets the item pricing level at which user 8 committed.

IV. Discounter

Referring to FIGS. 1 and 10–16, a discounter 26 in accordance with the invention will be described in more detail. As shown in FIG. 1, discounter 26 includes an administration module 34 and a calculator 36. FIG. 10 is a simplified spreadsheet illustrating a preferred embodiment of how system 6 organizes data regarding an exemplary quote/purchase for an individual user buying items. FIG. 11 is a simplified spreadsheet illustrating a preferred embodiment of how system 6 organizes data regarding an exemplary quote/purchase for a coop of more than one user 8. FIG. 12 is a spreadsheet illustrating data organization in more detail.

The spreadsheets exemplify how system 6 organizes data for both a quote and a purchase. With regard to storage of data after a purchase, the coop data shown in FIG. 11 is continually updated as member users make purchases so achievement of a discounted price(s) by the coop can be determined even though member users make purchases at different times. The data for an individual user, shown in FIG. 10, may also be updated as a user 8 makes further purchases to track user's usage of system 6 and, potentially, provide a discounted price(s) based on use over time. With regard to quotes, the data shown in FIGS. 10–12 also exemplifies how system 6 organizes data in temporary files during the various calculations provided during an estimation of a quote. Of course, other temporary files may also be created and used by system 6, as necessary, during calculations.

Turning to the details of the spreadsheets of FIGS. 10–12, system 6 preferably organizes items according to one or more discrete "units," shown as cells of each spreadsheet. As used herein a "unit" is a convenient organizational set of item(s) for which calculations may be conducted. Referring to FIG. 10, in a preferred embodiment, there are four types of units: an item unit 122, a total order unit 120, a group unit 124 and a master group unit 126. Like units may be referred to as a "tier", which is represented in FIGS. 10–12 by a row. It should be recognized that the invention is not limited to four different types of units. For example, as shown in FIG. 12, more than one tier of units may be provided in how a senior or first group unit 124A–F may be broken into two junior or second group units 224A–C and 224D–F.

As used herein the term "volume" is any quantitative measure by which items may be counted. For example, "volume" may be quantity, monetary cost, weight or any other convenient measurement by which items may be quantified. In the example shown FIG. 10, volume is measured in quantity such as 2150 total items associated with total order unit 120. However, as illustrated in FIG. 12, the type of volume used for an item may vary according to the type of item. For instance, one exemplary environment is that of an electrical supply company. In this setting, most items are quantified by quantity (e.g., item units 122D–I in FIG. 12) or monetary amount (e.g., item units 122A–C in FIG. 12). However, electrical conduit is provided by weight, e.g., pounds (see, e.g., item units 122J–L in FIG. 12). Accordingly, practically any volume by which items may be counted is considered within the scope of the invention. Furthermore, in some instances, an item may be measurable in two different types of volume, in which case the two volumes may be tracked simultaneously. For instance, wire may be sold by length, but shipped by weight. In this case, the item unit may track both length and weight. This is illustrated in FIG. 12 in how each item, although some are not measured in weight, include a weight indication.

An "item unit" has as a member a particular item. For example, as shown in FIG. 10, the exemplary data includes twelve item units 122A–L representing twelve different items A–L. FIG. 12 includes thirteen. As mentioned above, what may be generally considered a single item, however, may be a member of a number of item units where different variants, for example, size, color, adaptability, etc., of the item are possible. Each item unit has associated therewith a volume amount of item(s). For instance, as shown in FIG. 12, item unit 122A has a volume 100 indicative of $100, the volume used to measure that item unit. A "group unit" includes one or more items that are measured by a common volume type, e.g., quantity, weight, monetary cost, etc. For example, as shown in FIG. 12, the particular order/purchase may include three group units: 124A–F measured in monetary amount, e.g., dollars; 124G–I measured in quantity; and 124J–L measured in weight, e.g., pounds. A group unit preferably includes items that are organized for convenient evaluation relative to some discounted price. For example, a group unit may, although not necessary, indicate items sold by a wholesaler that are from a particular manufacturer. Each group unit has associated therewith a cumulative volume amount based on the sum of volumes of its constituent item units. For example, as shown in FIG. 12, senior group unit 124J–L has a volume of 16,500, indicative of 16,500 pounds, the sum of item units 122J–L. A "master group unit" 126 includes multiple group units. For example, the particular order/purchase shown in FIG. 10 includes two master group units 126A–F (which includes group units 124A–D and 124C–F) and 126 G–L (which includes group units 124G–I and 124G–L). A master group unit preferably includes group units that are organized for convenient evaluation relative to some discounted price. For example, a master group unit may, although not necessary, indicate items sold by a particular wholesaler. A "total order unit" 120, as the name indicates, has as members all master group units in a quote/order/purchase. As will be described below, unlike group units and item units, master group units and the total order unit do not necessarily have associated volumes. For example, as shown in FIG. 12, no volume parameter is provided for master group unit 126 or total order unit 120.

As indicated above, each item unit and each group unit have an associated volume amount, e.g., as shown in FIG. 12, item unit 122A may have 100 and group unit 124A–F may have 903. Each item unit and each group unit may also have associated therewith at least one volume discount threshold. A "volume discount threshold" (hereinafter VDT) is a volume of items, the meeting or exceeding of which, results in a discounted price being given to user(s) 8. For example, as shown in FIG. 12, for an item unit 122D that measures volume in quantity and has VDT of 5, when user(s) 8 buys 5 or more items, a discounted price would be attributed to that user(s) 8. Just as the volume may vary according to the type of item, so may the VDT type. It should be recognized that each item unit or group unit may include more than one VDT. For example, the beforementioned item unit 122D also has VDTs at 10 and 30. A first set of VDTs may be provided for a particular unit, for example, at volume amounts indicative of delivery efficiencies. In this case, if user 8 buys a volume of items, a manufacturer may deliver direct, hence reducing handling charges that may be passed on as a discounted price. A second set of VDTs may then be provided at higher volume amounts where delivery efficiencies have been maximized but market conditions dictate further discounts.

In accordance with the invention, VDT(s) of each group unit are preferably ranked so VDTs achieved may be compared between group units that do not necessarily include the same item(s) or measure volume in the same way. In this way, a harmonizing model for volumes of items that are measured with different volume types is provided. Referring to FIG. 12, as an illustration in our exemplary setting of an electrical supply company, group unit 124J–L may include a variety of electrical conduit that is measured in pounds and group unit 124G–I may include a variety of tools that are measured by quantity. Group unit 124J–L includes a rank 10 VDT at 5000 lbs.; a rank 20 VDT at 10,000 lbs. and a rank 30 VDT at 50,000 lbs. Group unit G–I includes a rank 5 VDT at 15 items (i.e., tools); a rank 10 VDT at 30 items; and a rank 15 VDT at 100 items. As will be described in more detail below, using VDT rank a more robust comparison and analysis of available discounts using master group units may be provided. This functionality finds special advantage relative to large orders.

As indicated above, FIG. 11 is a spreadsheet illustrating how system 6 preferably organizes data regarding an exemplary quote/purchase for a coop of more than one user 8. FIG. 11 is substantially similar to FIGS. 10 and 12, except that the units provided are coop-based units, e.g., coop item units, coop group units, coop master group units, etc. Further, the volume tracked for each coop-based unit includes quotes/purchases of more than one user 8. For instance, FIG. 11 includes five users 8, i.e., persons A–E. Accordingly, system 6 also organizes data such that a coop of users 8 may pool their purchases and cumulatively attain a discounted price(s). Each coop item unit and coop group unit of FIG. 11, as will be described below, may have associated therewith at least one coop VDT, the meeting or exceeding of which, will provide a discounted price. VDTs within a coop unit may also be ranked as described above for evaluation at a coop master group unit level.

Relative to discounted price, practically any manner of delivering a discounted price is considered within the scope of the invention. For instance, providing set prices at each VDT, using a formula to calculate price based on cost or percentage discount, a straight discount, etc. Relative to coops, discounted price may be distributed by practically any manner. For example, a discounted price may be calculated, as described above, through coop rules established by the coop administrator. For example, profit may be set aside for a coop administrator by adding a coop cost to the item costs, or not passing on part of a discounted price to coop users. In this way, a coop administrator may build a profit into the equation so as to reward the administrator for his/her role as administrator.

A. Administration Module

Administration module 34 is accessible by a system director 9 for administering system 6. In particular, administration module 34 includes a unit setting module 40 and a discount rule module 42. Unit setting module (USM) 40 provides a mechanism allowing a system director 9 to add items to system 6 and create and set membership of units. Discount rule module 42 provides a mechanism by which system director 9 may set a number of unit parameters, as will be described below.

1. Item Units

When an item is entered, USM 40 provides entry of item information such as item unit name, stock keeping unit (SKU), part number, description (long and short), manufacturer, category, UPC code, SIC code and SIN code (for government use only), cross reference information, cost, volume type including volume identifiers (e.g., lbs., dollars, etc.), packaging, picture or image, each initial selling price, etc. Furthermore, with reference to unit membership, in a preferred embodiment, items are automatically organized, or set, as members of an item unit 122 (FIGS. 10 and 12) when entered into system 6. An item unit, therefore, has as a member a particular item. For example, as shown in FIG. 10, the exemplary data includes twelve item units 122A–L representing twelve different items A–L.

Using discount rule module 42, system director 9 may, although not necessary, assign each item unit at least one VDT and an associated discount price for each VDT. For instance, as shown in FIG. 12, an exemplary VDT of 100 for item unit 122A can be provided. The discounted price associated with that VDT (not shown) may be, for example, a cost of $0.04 each (compared to the initial standard price of $0.05 each), a 0.5% discount for each item, etc. If desired, more than one VDT may be provided, each with its own associated discounted price. However, it should also be recognized that an item unit may not be assigned any VDTs.

2. Group Units

In addition, other units can be created and membership set using USM 40. USM 40 preferably allows setting membership of at least one item 122 of system 6 in at least one group unit 124 (FIGS. 10 and 12). This function may be provided when a group unit 124 is created, which normally entails providing entry of: group unit name; volume type and volume identifiers of group unit, etc. Similarly, when an item is added, the item, i.e., item unit, may be set to be a member of at least one group unit 124 already established in system 6. In any regard, each group unit 124 includes one or more item units, i.e., kinds of items. For example, as shown in FIG. 10, the particular order/purchase includes four group units 124A–D, 124C–F, 124G–I, 124J–L. As indicated by group unit 124A–D compared to group unit 124C–F, items may be organized, or set, to more than one group unit, i.e., items C and D are members of both group units 124A–D and 124C–F. As mentioned above, each group unit also includes an associated cumulative volume indicative of volume amounts of its constituent item unit(s). For example, group unit 124A–F of FIG. 12 includes a cumulative volume of 903, i.e., $903.

Using discount rule module 42, system director 9 may: assign at least one VDT in each group unit, selectively rank at least one VDT in each group unit and associate a discounted price to each VDT of the group unit. At least one VDT for each group unit may be created by entering a respective volume amount(s) at which a discounted price will be provided. For instance, as shown in FIG. 12, for group unit 124A–F an exemplary 'first senior group VDT' of 800 is provided. In addition, at least one VDT of each group unit is also preferably assigned a rank. A "rank" is a grading given to VDT(s) of a group unit. The rank of the first VDT of group unit 124A–F is 1, as indicated in FIG. 12. In some cases, comparison and analysis between group units is difficult because they may have different items measured with different volume types or may have divergent VDT intervals. For example, when dealing with monetary amount, one group unit may have VDT(s) at $100 intervals, while another may have VDT(s) at $10,000 intervals. Providing ranks allows for determination of discounted price at a master group unit level, and provides a harmonizing standard for comparison and analysis between group units. Without ranks, comparison between group units is oftentimes impossible. Using discount rule module 42, each group unit is also preferably assigned a maximum rank attainable. As an alternative to simply assigning a discounted price to a VDT, an associated discount formula or table associated with rank may be provided via discount rule module 42 so that discounted price can be applied back to constituent item units.

It should be recognized that VDTs do not necessarily have to be ranked sequentially or according to increasing volume amounts. For instance, for a group unit having VDTs at 500, 1000, 1500, 2000 and 2500, a rank 1 may be assigned to 500, 1000, 1500 and 2000, and a rank 2 at 2500. Further, a group unit may include ranks starting at above minimum, e.g., on a scale of 1 to 10, ranks of 5 or higher. This may be the case where, for example, a group unit has an exceptionally high first VDT compared to other group units.

Referring to FIG. 12, USM 40 may also be configured to create tiers of group units so that useful sub-organizations of group units can be provided. For instance, a senior or first group unit 124A–F, may be broken into two junior or second group units 224A–C and 224D–F. Accordingly, USM 40 allows setting membership of at least one item in at least one second group unit. Each second group unit has associated therewith a cumulative volume of the at least one item therein. In addition, discount rule module 42 may also be further configured to allow setting at least one discount threshold, each having an associated discounted price, for each second group unit.

At discount rule module 42, a system director 9 may also set a next VDT variance V for each item unit and/or each group unit. Next VDT variance is used to determine when discounter 26 will recommend a purchase in a unit to attain a next VDT. In particular, for each unit having a quote or purchase for X amount of items, a VDT and a variance V, discounter 26 would recommend purchasing an amount of item in the volume unit when $VDT-X \leq V$. This determination would be conducted for each VDT in each item unit and each group unit, as will be described below.

3. Master Group Units

USM 40 also preferably provides for setting membership of at least one group unit 124 into at least one master group unit 126. This function may be provided when a master group unit 126 (FIGS. 10 and 12) is created, which normally entails providing entry of: master group unit name and other general information. Similarly, when a group unit 124 is added, it may be set to be a member of at least one master group unit 126 already established in system 6. In any regard, each master group unit 126 includes one or more group units. For example, FIG. 10 includes two master group units 126A–F (which includes group units 124A–C and 124D–F) and 126 G–L (which includes group units 124G–I and 124G–L). Group units may also be organized, or set, to more than one master group unit.

Using discount rule module 42, system director 9 may also assign to each master group unit 126: at least one rank discount threshold (RDT) and/or a formula or table to determine discounted price based on a compounding effect of achieved rank(s) of group units. Usage of aggregate rank (e.g., a sum of the highest achieved ranks of constituent group unit(s)) is one way to implement a discount formula/table. A "rank discount threshold" is a rank level that may be associated with each master group unit, the meeting or exceeding of which by an aggregate rank results in a discounted price. For example, as shown in FIG. 12, master group unit 126 includes RDTs of 5, 10 and 20 and an aggregate rank of member group units (called Master Group Rank Threshold Obtained) of 6, i.e., 1 from group unit 124A–F and 5 from group unit 124G–I. Hence master group 126 has reached its first RDT and is entitled to a discounted price.

It should be understood, however, that the discount formula/table used may provide for a variety of discounted price calculations other than those based on a simple combination of achieved ranks. As another example, where five constituent group units have achieved a rank 2 VDT, a compounding effect may have resulted such that a master group discount formula would grant each group unit a discounted price associated with an achieved rank 3 VDT. Hence, in this setting, discounted price may not be created directly, but indirectly by increasing an achieved rank of a group unit. As another example, a master group discount formula may provide an increase level of rank by 2 for each constituent group unit when an aggregate rank reaches 20. It should be recognized that aggregate rank may also refer to not just cumulative rank, but also rank averaging and any other manner of meaningfully combining ranks.

As described above relative to group units, USM 40 may also be configured to create tiers of master group units so that useful sub-organizations of master group units can be provided. For instance, master group unit 124G–L (FIG. 10), may be broken into two second tier master group units including items G–H and I–L, respectively. Accordingly, USM 40 allows setting membership of at least one group unit in at least one second master group unit. Each second master group unit may have associated therewith a discount formula or table, as described above.

It should also be understood that although exemplary bases for creating a group or master group unit have been mentioned, practically any convenient organization of items may be created by group and master group units.

4. Total Order Units

The membership of total order unit 120 is automatically set as including all units in a quote/purchase. Total order unit 120, however, may be evaluated by either volume or rank.

5. Cooperatives

Where coop purchasing is provided, as discussed relative to FIG. 11, unit setting module 40 and discount rule module 42 may also provide their respective functions for coop units. That is, USM 40 may allow for the creation of coop-based units and coop-based VDTs/RDTs, etc. Further, discount rule module 42 provides for setting at least one coop discount threshold for each group unit 126.

All data created by administrator 24 and tracked by system 6 is stored in database 20.

B. Calculator

Figure 13:
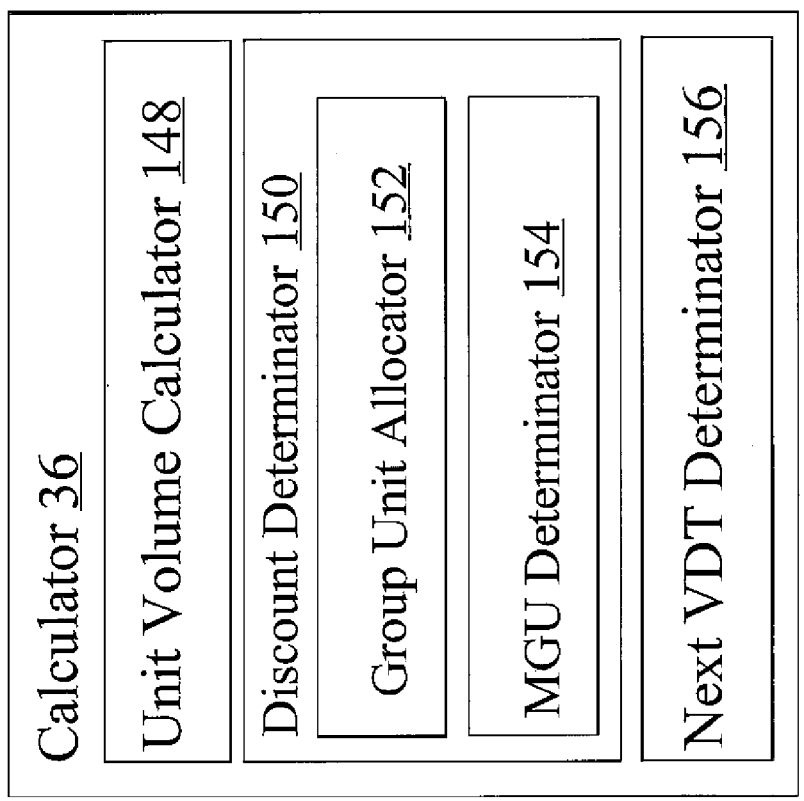
FIG. 13 is a block diagram of a calculator of the system of FIG. 1.

Discounter 26 also includes a calculator 36 for conducting a number of discount related tasks. Referring to FIG. 13, calculator 36 includes the following components: a unit volume calculator 148; a discount determinator 150 including a group unit item allocator 152 and a master group unit determinator 154; and a next VDT determinator 156.

Unit volume calculator 148 is configured to calculate a volume amount for a unit as directed by other components of discounter 26.

Discount determinator 150 provides a mechanism by which system 6 can evaluate which discounted price(s) that are attainable with a quote/purchase provide the lowest total price and makes recommendations for further items to be quoted/purchased to further increase the level of discounts included. Discount determinator 150 includes a group unit allocator 152 and a master group unit (MGU) determinator 154.

Group unit allocator 152 is configured to determine an allocation of items that provides the lowest total price. As indicated above, an item, or item unit 122, may be set as a member of one or more group units 124. In accordance with the invention, a volume of an item unit quoted/purchased may be allocated to different group units when the item unit is a member of more than one group unit to attain as many discounted price(s) as possible, i.e., minimize the overall total price. For example, an item unit 122 for which a user 8 has requested a quote or purchased a volume of 500 may have the volume split between two group units to attain VDTs in each group unit. For example, referring to FIG. 12, assuming 500 additional items were quoted/purchased and the item unit was a member of each group unit 124, group unit allocator would determine which allocation of the 500 items in the group units resulted in the maximized discounted price. The calculations necessary to make this determination are discernable to one with ordinary skill in the art, but may include, for example, creating temporary units for comparison, calculation through all combinations of units and selection of which combinations/allocations result in the maximized discounted price. Similarly, where allocation of a portion of a quote/purchase to a group unit may lead to increased cost, group unit allocator 152 may avoid allocating volume to that group unit. This may be the case, for example, where a group unit may have reached a convenient size for shipping and further items would increase delivery costs.

In conjunction with group unit allocator 152, next VDT determinator 156 recommends selection of additional volume to attain a next discount threshold. In particular, next VDT determinator 156 evaluates for each group unit having: a quote/purchase for X amount of items, a VDT and a variance V, when VDT−X≦V. When this occurs next VDT determinator 156 recommends purchasing additional volume, which can be communicated by recommending at least one additional item (i.e., an item unit not in the quote or purchase but a constituent item unit of the group unit) in a sufficient volume to attain the next VDT, or an additional amount (i.e., an additional amount of an item already in the quote/purchase) to attain the next VDT for the group unit. For example, referring to FIG. 12 and, in particular, group unit 124J–L has 16,500 already in it, if a user requested a quote/purchase of 12,000 lbs. of item J and 21,000 of item L, for a total of 33,000, it would leave the user 500 lbs. short of the third VDT of 50,000 lbs. for that group unit. Hence, next VDT determinator 156 would recommend additional volume by, for example, suggesting quote/purchase of an additional volume of 500 lbs. of item J and/or L, or quote/purchase of an additional item K (none of which was previously quoted/purchased) at a 500 lb. volume. Furthermore, for each item unit, next VDT determinator 152 recommends selection of additional volume to attain a next discount threshold for each item unit that has a VDT. In particular, next VDT determinator 156 evaluates for each item unit having: a quote/purchase for X amount of items, a VDT and a variance V, when VDT−X≦V. When this occurs next VDT determinator 156 recommends purchasing an additional amount so that the item unit volume is equal to or exceeds the next VDT for the item unit. Accordingly, a user 8 may receive a number of recommendations to attain a next VDT on a group unit and/or item unit level. FIG. 5 illustrates a recommendation 160 to 'Buy 40 more 20A 1 Pole Space Breakers to receive a 10% discount.'

Master group unit determinator 154 is configured to determine award of an additional discounted price based on achieving a discount threshold, or rank, in at least one, and preferably more than one, group unit. The basis on which determinator 154 awards additional discounted price is preferably determined by one of a discount formula or a discount table. As noted above, one example discount formula/table may provide discounted price based on an aggregate rank. For instance, referring to FIG. 12, master group unit 126 has an aggregate rank of 6, i.e., 1 from group unit 124A–F and 5 from group unit 124G–I, which exceeds the first master group RDT of 5. According to a discount formula, this may provide an increase level of rank by 2 for each constituent group unit 124A–F and 124G–I.

As another example, the formula or table may be configured to evaluate additional discounted price based on the highest achieved rank for each group unit. For example, when the achieved ranks of group units of a master group unit meet a standard, a discounted price associated with a rank higher than any achieved rank may be provided to each group unit. For example, where three of five constituent group units have a highest achieved rank of rank 2 VDT, a compounding effect may have resulted such that a master group unit discount formula would grant each group unit a discounted price associated with an achieved rank 3 VDT. Hence, in this setting, discounted price may not be created directly, but indirectly by increasing a discounted price of a group unit beyond any achieved rank. Practically any manner of providing an additional discounted price by evaluation of rank of constituent group units is possible at the master group level.

With regard to coops, calculator 36 provides the same calculations as described above for the coop. Where a user 8 is a member of a coop, however, discounter 26 makes recommendations with preference to user 8 obtaining the lowest total price rather than the coop as a whole.

Where tiers of group units or tiers of master group units are provided, calculator 36 is further configured to provide the functionality described above for every tier. For example, calculator 36 recommends selection of at least one additional item or additional volume to attain a next discount threshold in each second group unit.

V. Method

The present invention also includes a method for calculating discounts for quotes or purchases of items, the method comprising the steps of: allowing selection of an item by a user to attain a quote; organizing an item available for purchase into an item unit and at least one group unit that includes one or more items, each item unit and each group unit having associated therewith a volume; setting at least one discount threshold for each item unit and each group unit, each discount threshold having an associated discounted price; calculating when a volume of an item unit is within a discount variance of a next discount threshold for the item unit; recommending selection of additional volume to attain the next discount threshold for the item unit; calculating when a volume of a first group unit is within a discount variance of a next discount threshold for the first group unit; and recommending selection of additional volume to attain the next discount threshold for the first group unit.

The step of organizing may further include organizing at least one group unit into at least one master group unit that includes one or more group units. The method may also include assigning at least one discount threshold in each first group unit a rank, and, when the achieved ranks of the first group units of the master group unit meet a standard, e.g., as provided by a discount formula or table, providing a discounted price associated with a rank higher than any achieved rank to each first group unit. The step of setting at least one discount threshold for each item unit and each group unit may include setting a discount threshold based on one of: a monetary amount, weight and quantity. The method may also include the step of allocating a volume of an item between more than one group unit to maximize the discounted price. The method may also include the step of pooling user purchases into a coop to cumulatively attain a discount threshold. When a coop is used, the steps of recommending may include recommending a selection with preference for an individual user. Finally, the method may include the step of allowing a user to make a purchase of the selected item.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A system for calculating discounts on items, the system comprising:

a processor; and a memory, including a program executable by the processor, the program including:

an estimator configured to allow user selection of at least one item for creating a cost quote of total price for a purchase order, each item being a member of an item unit with items of a particular kind, the item unit having associated therewith a volume;

a unit setting module configured to allow setting membership of a plurality of item units with related item units in at least one first group unit in the purchase order, each item unit in a first group unit having a type of volume that is the same, each first group unit having associated therewith a cumulative volume of the at least one item unit therein;

a discount rule module configured to allow setting at least one discount threshold for each first group unit in the purchase order, each discount threshold of a first group unit having an associated discounted price given to a user when the discount threshold is met; and a calculator configured to recommend selection of additional volume to attain a next discount threshold, wherein the discount rule module is further configured to selectively assign a rank to each discount threshold of each first group unit, wherein the rank indicates a reference level of each discount threshold.

2. The system of claim 1, wherein, when an item unit is a member of more than one first group unit, the calculator is further configured to determine an allocation of volume of an item unit amongst the first group units to achieve a minimized total price.

3. The system of claim 1, wherein the calculator is further configured to determine award of an additional discounted price based on achieving a discount threshold in more than one first group unit.

4. The system of claim 1, wherein the calculator is configured to recommend selection of additional volume when a volume selected is within a discount variance of the next discount threshold.

5. The system of claim 1, wherein the type of volume is determined by the type of item and is chosen from the group comprising: a monetary amount, weight and quantity.

6. The system of claim 1, wherein each first group unit includes more than one discount threshold.

7. The system of claim 1, wherein the discount rule module is further configured to allow setting at least one discount threshold for each item unit, each discount threshold for an item unit having an associated discounted price.

8. The system of claim 7, wherein the calculator is further configured to recommend selection of additional volume to attain a next discount threshold for an item unit.

9. The system of claim 7, wherein the calculator is configured to recommend selection of additional volume when a volume selected is within a discount variance of the next discount threshold for the item unit.

10. The system of claim 1, wherein the unit setting module is further configured to allow setting membership of at least one first group unit into at least one master group unit, and the discount rule module is further configured to allow setting one of a discount formula and a discount table for each master group unit.

11. The system of claim 10, wherein the calculator is further configured to determine a discounted price using one of the discount formula and discount table and an achieved rank of at least one first group unit.

12. The system of claim 11, wherein the one of the discount formula and discount table provide a discounted price based on a highest achieved rank for each first group unit.

13. The system of claim 12, wherein a discounted price provided by the one of the discount formula and discount table is provided by assigning a discounted price associated with a rank higher than any achieved rank to each first group unit.

14. The system of claim 1, further comprising a coop module configured to allow creation of a coop of a plurality of users to pool purchases and cumulatively attain a discounted price.

15. The system of claim 14, wherein the discount rule module is further configured to set at least one coop discount threshold for each first group unit and each item unit.

16. The system of claim 14, wherein the calculator is configured to recommend selection of at least one additional item or additional volume to attain a next discount threshold with preference for minimizing the total price of an individual user rather than the coop.

17. The system of claim 14, wherein the coop module is configured to allow an administrator to set at least one of: purchase closing time, pricing structure, maximum discount threshold available and coop membership rules.

18. The system of claim 14, wherein the unit setting module is further configured to allow setting membership of at least one first group unit into at least one master group unit, and the discount rule module is further configured to allow setting one of a discount formula and a discount table for each master group unit.

19. The system of claim 18, wherein the discount rule module is further configured to selectively assign a rank to each discount threshold of each first group unit.

20. The system of claim 19, wherein the calculator is further configured to determine a discounted price using one of the discount formula and discount table and an achieved rank of at least one first group unit.

21. The system of claim 20, wherein the one of the discount formula and discount table provide a discounted price based on a highest achieved rank for each first group unit.

22. The system of claim 21, wherein a discounted price provided by the one of the discount formula and discount table is provided by assigning a discounted price associated with a rank higher than any achieved rank to each first group unit.

23. The system of claim 1, further comprising a purchasing module configured to permit a user to make a purchase of the selected at least one item.

24. The system of claim 1, wherein the unit setting module is further configured to allow setting membership of at least one item unit in at least one second group unit, each second group unit having associated therewith a cumulative volume of the at least one item unit therein;
the discount rule module is further configured to allow setting at least one discount threshold for each second group unit, each discount threshold of a second group unit having an associated discounted price given to a user when the discount threshold is met; and
the calculator is further configured to recommend selection of additional volume to attain a next discount threshold in each second group unit.

25. The system of claim 24, wherein, when an item unit is a member of more than one second group unit, the calculator is further configured to determine an allocation of volume of an item amongst the second group units to achieve a minimized total price.

26. A computer implemented method for calculating discounts for quotes or purchases of items, the method comprising the steps of:

allowing selection of an item by a user to attain a quote for a purchase order;
organizing an item available for purchase into an item unit with other items of a particular kind and at least one first group unit in the purchase order, the first group including a plurality of item units where the item units are related and have a type of volume that is the same, each item unit and each group unit having associated therewith a volume;
setting at least one discount threshold for each item unit and each first group unit in the purchase order, each discount threshold having an associated discounted price;
calculating when a volume of an item unit is within a discount variance of a next discount threshold for the item unit;
recommending selection of additional volume to attain the next discount threshold for the item unit;
calculating when a volume of a first group unit is within a discount variance of a next discount threshold for the first group unit;
recommending selection of additional volume to attain the next discount threshold for the first group unit; and
assigning at least one discount threshold in each first group unit a rank, and, in the case that the achieved ranks of the first group units of the master group unit meet a standard, providing a discounted price associated with a rank higher than any achieved rank to each first group unit, wherein the rank indicates a preference level of each discount threshold.

27. The method of claim 26, wherein the step of organizing further includes organizing at least one first group unit into at least one master group unit that includes one or more group units.

28. The method of claim 26, wherein the step of setting at least one discount threshold for each item unit and each first group unit includes setting a discount threshold based on one of: a monetary amount, weight and quantity.

29. The method of claim 26, further comprising the step of allocating a volume of an item unit between more than one first group unit to maximize the discounted price.

30. The method of claim 26, further comprising the step of pooling user purchases into a coop to cumulatively attain a discount threshold.

31. The method of claim 30, wherein steps of recommending includes recommending a selection with preference for an individual user rather than the coop.

32. The method of claim 26, further comprising allowing a user to make a purchase of the selected item.

33. A system for estimating purchase cost of items and making a recommendation to attain a discounted price, the system comprising:
a processor; and
a memory, including a program executable by the processor, the program including:
a) an estimator configured to allow a user to select multiple items of different types to attain a total price quote for a purchase order;
b) an administration module configured to allow organization of each item into at least one group unit having a plurality of item types with related items in the purchase order, each item in a group unit having a type of volume that is the same, each group unit including at least one discount threshold that may be attained by selection of a volume of an item organized therein;
c) a discounter including a calculator configured to;
   i) determine a next discount threshold for each group unit in the purchase order; and
   ii) recommend selection of additional volume to attain a next discount threshold in at least one unit; and
d) a purchasing module configured to permit a user to make a purchase,
wherein the discounter is further configured to selectively assign a rank to each discount threshold of each group unit, wherein the rank indicates a preference level of each discount threshold.

* * * * *